US012606113B1

(12) United States Patent
Mankame et al.

(10) Patent No.: US 12,606,113 B1
(45) Date of Patent: Apr. 21, 2026

(54) ENERGY ABSORBING FOLDABLE STRUCTURE FOR VEHICLE

(71) Applicant: GM GLOBAL TECHNOLOGY OPERATIONS LLC, Detroit, MI (US)

(72) Inventors: Nilesh D. Mankame, Ann Arbor, MI (US); Manuel Forero Rueda, Royal Oak, MI (US); Hanif Muhammad, Ann Arbor, MI (US); Paul E. Krajewski, Troy, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 19/076,293

(22) Filed: Mar. 11, 2025

(51) Int. Cl.
B60R 21/04 (2006.01)

(52) U.S. Cl.
CPC .. B60R 21/0428 (2013.01); *B60R 2021/0414* (2013.01)

(58) Field of Classification Search
CPC ..... B60R 21/02; B60R 21/04; B60R 21/0428; B60R 21/055; B60R 21/06; B60R 21/08; B60R 2021/0414; B60R 2021/0435; B60R 2021/065
USPC ................................................. 280/748, 751
See application file for complete search history.

(56) References Cited

U.S. PATENT DOCUMENTS

| | | | | | |
|---|---|---|---|---|---|
| 6,050,631 | A | * | 4/2000 | Suzuki | ................... B60R 22/201 296/187.05 |
| 11,325,551 | B2 | * | 5/2022 | Campbell | ................ B60R 21/20 |

| | | | | | |
|---|---|---|---|---|---|
| 12,036,935 | B1 | * | 7/2024 | Home | ................... B60R 21/026 |
| 12,187,436 | B2 | * | 1/2025 | Chavarria Garcia | ........................ B64D 11/0639 |
| 12,296,769 | B1 | * | 5/2025 | Sundaram | ............. B60R 21/055 |
| 2002/0109343 | A1 | * | 8/2002 | Sugimoto | ............... B60R 21/04 188/371 |
| 2002/0177934 | A1 | * | 11/2002 | Yokota | .............. B60R 21/01554 701/45 |
| 2004/0108752 | A1 | * | 6/2004 | Rajasingham | .......... B60R 21/02 296/68.1 |
| 2006/0033362 | A1 | * | 2/2006 | Barvosa-Carter | ....... B60R 21/04 296/187.05 |
| 2008/0150324 | A1 | * | 6/2008 | Jayasuriya | .......... B60R 11/0217 296/187.12 |
| 2009/0278363 | A1 | | 11/2009 | Browne et al. | |

(Continued)

FOREIGN PATENT DOCUMENTS

| | | | | | |
|---|---|---|---|---|---|
| CN | 218750231 | U | * | 3/2023 | |
| GB | 2306410 | A | * | 5/1997 | ............ B60J 5/0425 |
| JP | H02249740 | A | * | 10/1990 | |

OTHER PUBLICATIONS

German Office Action for German Application No. 102025115528.3; dated Feb. 26, 2026; 16 pages.

*Primary Examiner* — Jason D Shanske
*Assistant Examiner* — Daniel M. Keck
(74) *Attorney, Agent, or Firm* — CANTOR COLBURN LLP

(57) ABSTRACT

An energy absorbing structure of a vehicle includes an energy absorbing structure including a plurality of interconnected structural members positioned at the vehicle. The energy absorbing structure is selectably transformable between a stowed position and a deployed position, and the plurality of interconnected structural members are configured to absorb an energy of an impact event by one or more of deformation and fracture of at least one structural member of the plurality of interconnected structural members.

17 Claims, 8 Drawing Sheets

(56)     References Cited

U.S. PATENT DOCUMENTS

| | | |
|---|---|---|
| 2015/0251617 A1 | 9/2015 | Gandhi |
| 2015/0321590 A1 | 11/2015 | Mizoi et al. |
| 2018/0319345 A1* | 11/2018 | Fleischhacker ......... B60R 21/06 |
| 2023/0373429 A1 | 11/2023 | Jaradi et al. |
| 2025/0333018 A1* | 10/2025 | Overton ................. B60R 21/06 |

* cited by examiner

ENERGY ABSORBING FOLDABLE STRUCTURE FOR VEHICLE

The subject disclosure relates to vehicles, and in particular to passenger energy absorption systems of vehicles.

Vehicles utilize various energy absorbing structures to, for example, protect occupants in front seats of vehicles, as well as occupants in rear seats of vehicles, in the event of a crash. The current state of the art includes seat belts that function to limit excursion of the pelvis and upper torso of the occupant while the head of the occupant may continue to move forward during, for example, a frontal impact. Some vehicles also utilize a side curtain airbag, which acts primarily to protect the head and neck area of a rear seat passenger in a side impact. The side curtain airbag has limited benefit in protecting a torso and/or lower body portion of the rear seat passenger as well as passengers in child safety seats. The art would welcome improvements in the protection of rear seat passengers, especially in a side impact event.

SUMMARY

In one exemplary embodiment, an energy absorbing structure of a vehicle includes an energy absorbing structure including a plurality of interconnected structural members positioned at the vehicle. The energy absorbing structure is selectably transformable between a stowed position and a deployed position, and the plurality of interconnected structural members are configured to absorb an energy of an impact event by one or more of deformation and fracture of at least one structural member of the plurality of interconnected structural members.

In addition to one or more of the features described herein, the plurality of interconnected structural members includes one or more of panels, struts and tubes.

In addition to one or more of the features described herein, the plurality of interconnected structural members extends between a side door of the vehicle and a passenger seat of the vehicle.

In addition to one or more of the features described herein, the plurality of interconnected structural members has a modular construction.

In addition to one or more of the features described herein, the plurality of interconnected structural members includes two base members pivotably secured to a vehicle structure at a first end of each of the two base members, and at least one end member secured at a second end of the two base members, opposite the first end.

In addition to one or more of the features described herein, in the deployed position at least one base member of the two base members has a deployment angle relative to the vehicle structure in a range of 30 degrees to 90 degrees.

In addition to one or more of the features described herein, the two base members are secured to an extend from a side door of the vehicle, and the at least one end member is positioned at a passenger seat.

In addition to one or more of the features described herein, in the stowed position the two base members extend along the side door.

In addition to one or more of the features described herein, one or more of the interconnected structural members includes one or more through openings defined by one or more of cutouts, stiffeners, or ribs.

In addition to one or more of the features described herein an actuator is configured to selectably urge the energy absorbing structure between the stowed position and the deployed position.

In another exemplary embodiment, a vehicle includes a vehicle body defining an occupant compartment, and two or more rows of seats positioned in the occupant compartment. The two or more rows of seats include a first seat row and a second seat row. A safety system for an occupant of a seat of the two or more rows of seats of the vehicle includes an energy absorbing structure including a plurality of interconnected structural members extending between a side door of the vehicle and a passenger seat of the vehicle. The energy absorbing structure is selectably movable between a stowed position and a deployed position, and the plurality of interconnected structural members is configured to absorb an energy of an impact event by one or more of deformation and fracture of at least one structural member of the plurality of interconnected structural members.

In addition to one or more of the features described herein, the plurality of interconnected structural members includes two base members pivotably secured to a vehicle structure at a first end of each of the two base members, and at least one end member secured at a second end of the two base members, opposite the first end.

In addition to one or more of the features described herein, the two base members are secured to and extend from the side door of the vehicle, and the at least one end member is positioned at the passenger seat.

In addition to one or more of the features described herein, in the stowed position the two base members extend along the side door.

In addition to one or more of the features described herein, an actuator is configured to selectably urge the energy absorbing structure between the stowed position and the deployed position.

In addition to one or more of the features described herein, one or more vehicle sensors are operably connected to the actuator to selectably activate the actuator.

In yet another exemplary embodiment, a method of operating a safety system for an occupant of a vehicle includes detecting presence of an occupant of a seat of the vehicle and moving an energy absorbing structure from a stowed position to a deployed position when the occupant is detected. The energy absorbing structure includes a plurality of interconnected structural members extending between a side door of the vehicle and a passenger seat of the vehicle. The plurality of interconnected structural members is configured to absorb an energy of an impact event by one or more of deformation and fracture of at least one structural member of the plurality of interconnected structural members.

In addition to one or more of the features described herein, the plurality of interconnected structural members includes one or more of panels, struts and tubes.

In addition to one or more of the features described herein, the plurality of interconnected structural members includes two base members pivotably secured to a vehicle structure at a first end of each of the two base members, and at least one end member secured at a second end of the two base members, opposite the first end.

In addition to one or more of the features described herein, the two base members are secured to and extend from the side door of the vehicle, and the at least one end member is positioned at the passenger seat.

The above features and advantages, and other features and advantages of the disclosure are readily apparent from the following detailed description when taken in connection with the accompanying drawings.

BRIEF DESCRIPTION OF THE DRAWINGS

Other features, advantages and details appear, by way of example only, in the following detailed description, the detailed description referring to the drawings in which.

DETAILED DESCRIPTION

Figure 1:
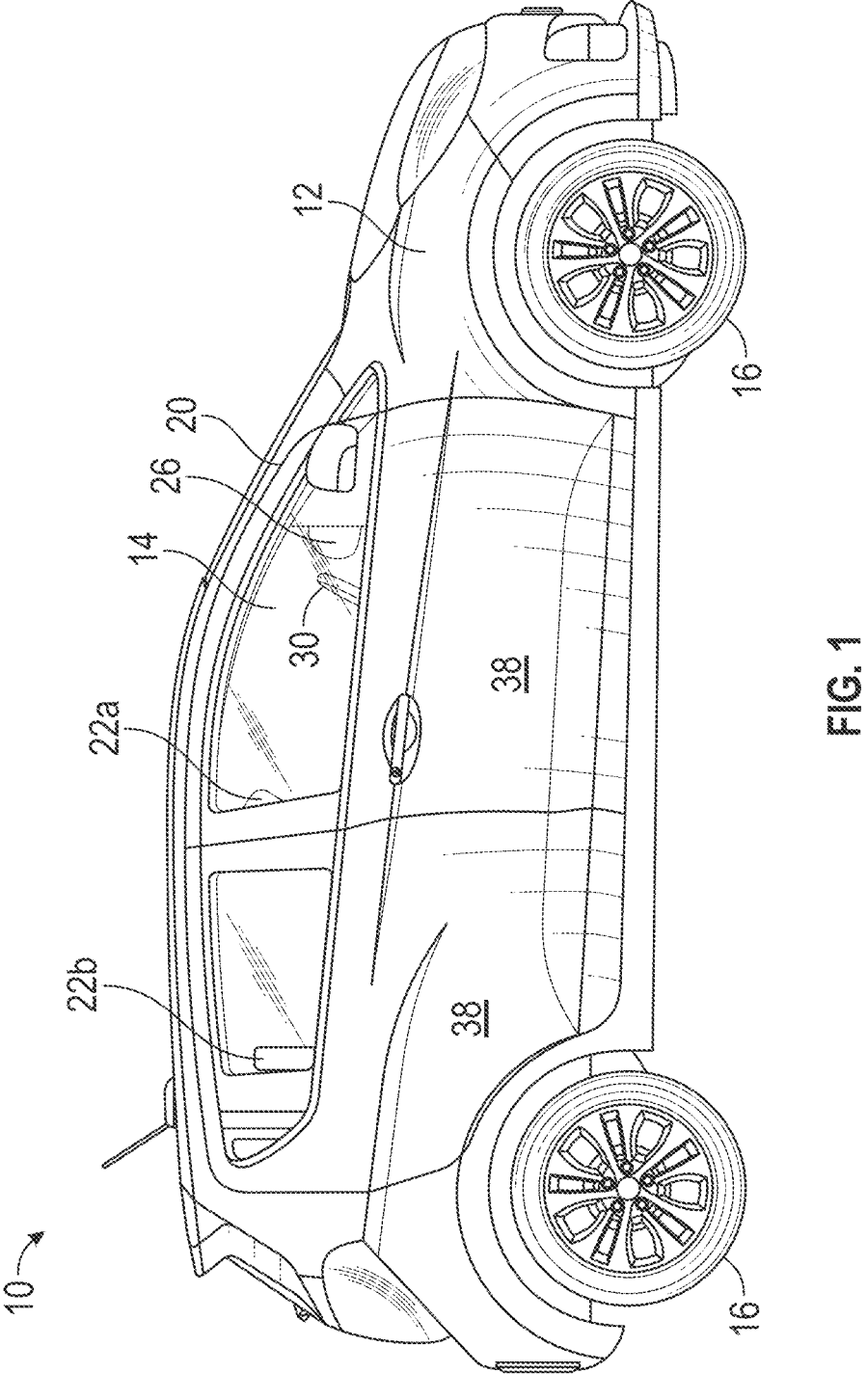
FIG. 1 is a side view of an exemplary embodiment of a vehicle.

The following description is merely exemplary in nature and is not intended to limit the present disclosure, its application or uses. It should be understood that throughout the drawings, corresponding reference numerals indicate like or corresponding parts and features.

In accordance with an exemplary embodiment a vehicle, in accordance with a non-limiting example, is indicated generally at 10 in FIG. 1. Vehicle 10 includes a body 12 supported on a plurality of wheels 16. In a non-limiting example, two of the plurality of wheels 16 are steerable. Body 12 defines, in part, an occupant compartment 14 having seats 22a and 22b (referred to also as 22) positioned behind a dashboard 26. A steering control 30 is arranged between seats 22 and dashboard 26. Steering control 30 is operated to control orientation of the steerable wheel(s) 16. The seats 22 include a front occupant seat 22a and at least one rear occupant seat 22b. While the vehicle 10 shown herein includes two rows of seats 22, one skilled in the art will readily appreciate that the present disclosure may be readily applied to vehicles having three or more rows of seats 22.

Figure 2:
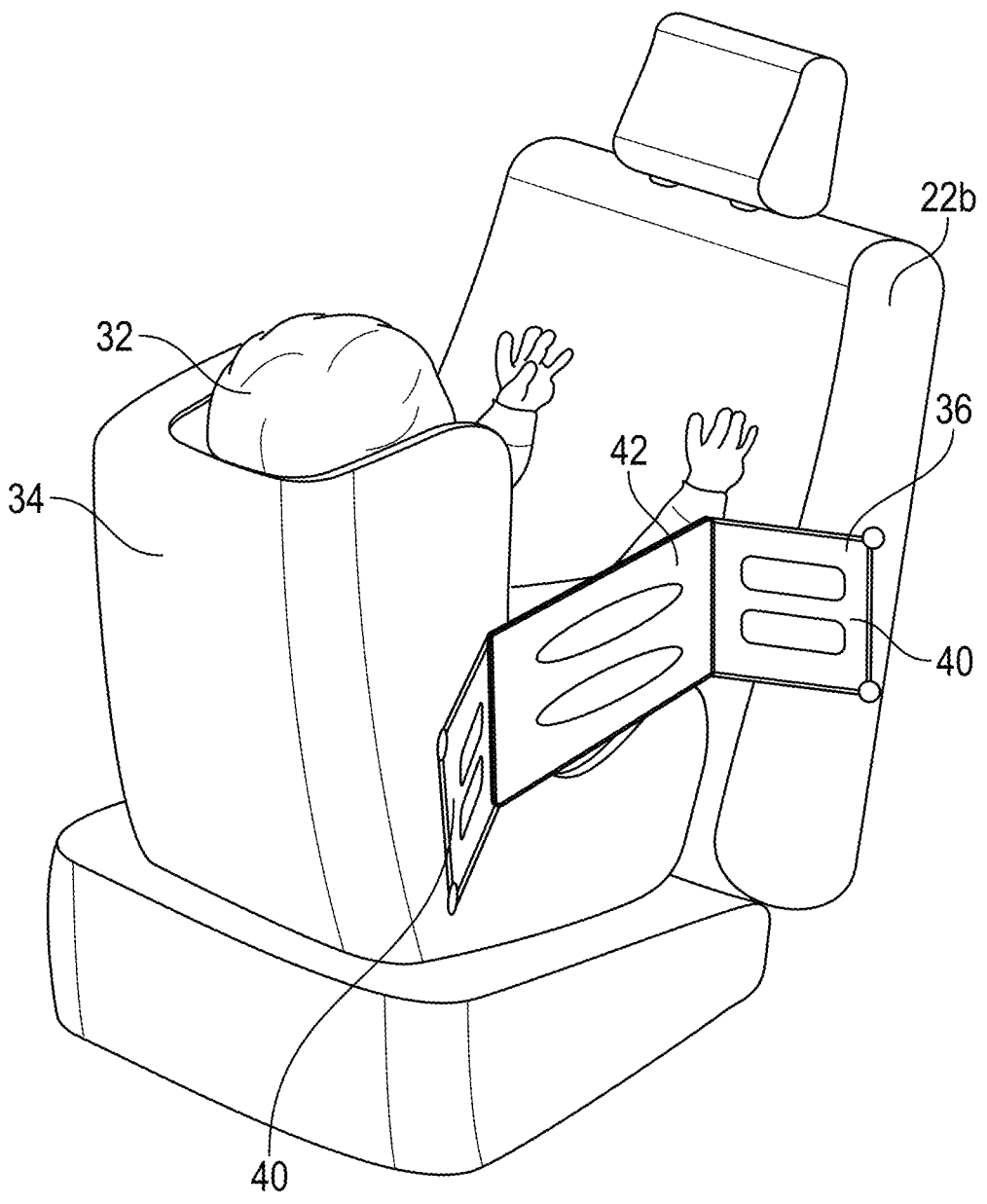
FIG. 2 is a perspective view of an exemplary rear occupant seat arrangement.

Illustrated in FIG. 2 is an exemplary arrangement of the rear occupant seat 22b having a passenger 32 seated therein. In some embodiments, the passenger 32 may be, for example, a child seated in a rear-facing child seat 34 secured into the rear occupant seat 22b. One skilled in the art will readily appreciate, however, that the principles of this disclosure may be readily applied to situations, such as where the passenger 32 is seated directly in the rear occupant seat 22b or where the passenger 32 is seated in a forward-facing child seat located in the rear occupant seat 22b. Further, the principles of this disclosure may be applied to other vehicle locations, such as a trunk or cargo compartment to protect the vehicle and its occupants from unanticipated movement of cargo during operation of the vehicle by providing impact absorption when needed. The present disclosure may also be applied to, for example, protect underbody components or the roof of the vehicle 10 in situations such as off-road operation of the vehicle 10.

Figure 3:
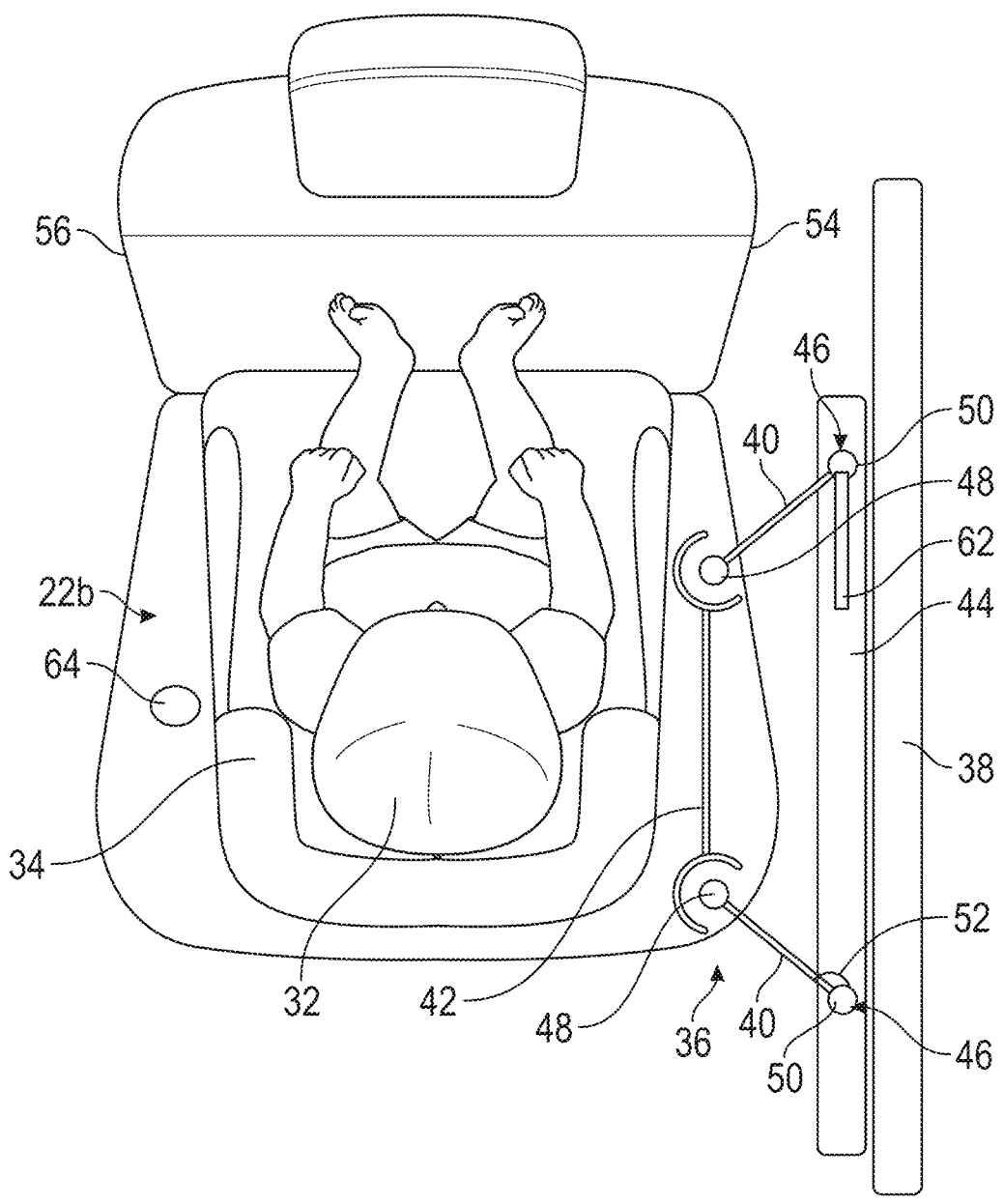
FIG. 3 is a top view of the rear occupant seat arrangement of FIG. 2.
Figure 8:
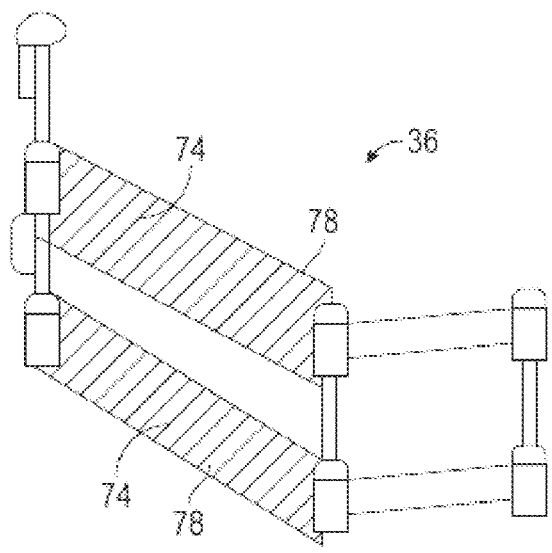
FIG. 8 is a perspective view of an exemplary embodiment of a structural member of an energy absorbing structure.
Figure 9:
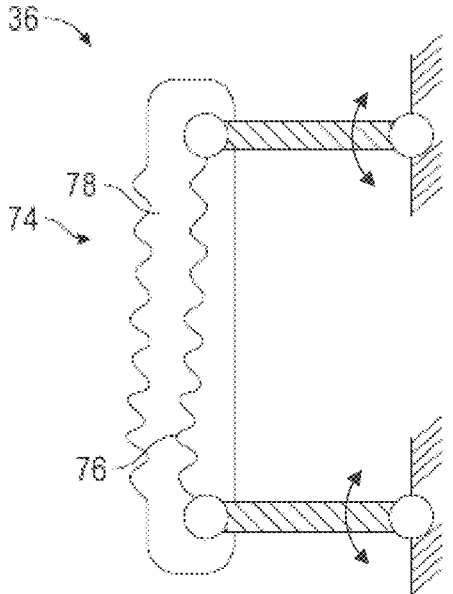
FIG. 9 is a cross-sectional view of an exemplary embodiment of a structural member of an energy absorbing structure.

An energy absorbing structure 36 is positioned between the passenger 32 and a vehicle side door 38, as best shown in FIG. 3. The energy absorbing structure 36 includes a plurality of interconnected structural members, for example, panels, beams, struts, tubes or other components. In some embodiments, such as illustrated in FIGS. 8 and 9, the structural members include struts 74 having a substrate 76 formed from a first material such as a thermoplastic material. The substrate 76 is at least partially encapsulated or enclosed in a jacket 78 of a second material, such as a foam, a rubber material or suitable traditional energy-absorbing material.

Figure 4:
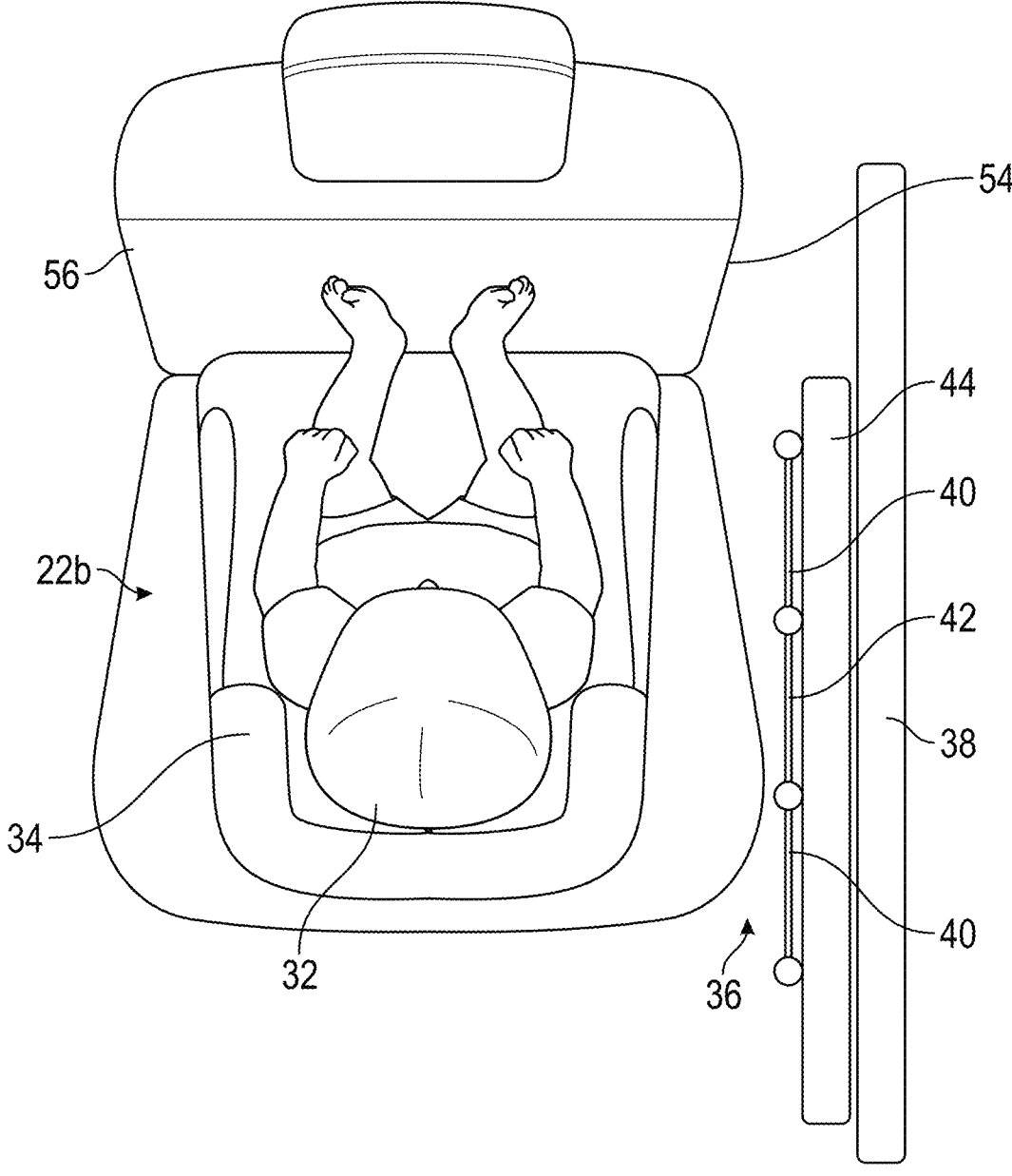
FIG. 4 is a top view of an exemplary embodiment of an energy absorbing structure in a stowed position.

Referring again to the exemplary embodiment of FIG. 3, the structural members include two base panels 40 and an end panel 42 connected to each of the base panels 40. While a three-panel configuration is illustrated and described herein, one skilled in the art will readily appreciate that other panel configurations, such as 4, 5 or more panels or other structural elements such as struts, may be utilized to achieve desired energy absorption properties. The construction of the energy absorbing structure 36 is modular, such that, for example, the base panels 40 may have a first construction or configuration, while the end panel 42 may have a second construction configuration. Differences in construction configurations may include, for example, different materials, different material thicknesses, and different resultant energy absorbing properties of the various structural members. The modularity of the construction allows for changing of the structural members of the energy absorbing structure 36 depending on, for example, use or application of the energy absorbing structure 36, and energy absorbing requirements. The base panels 40 are secured to a structure of the vehicle, such as a structural member of the door. In FIG. 3, the base panels of the energy absorbing structure are secured to a trim panel 44 of the vehicle side door 38 at a first panel end 46 and are each connected to the end panel 42 at a second panel end 48, opposite the first panel end 46. The connection to the door trim panel 44 at the first panel end 46 may be a pivot 50, so the base panels 40 are moveable between a stowed position, such as shown in FIG. 4, where the base panels 40 extend in a direction along the door trim panel 44, and a deployed position, such as shown in FIG. 3. In the deployed position, the base panels 40 each define a deployment angle 52 to the door trim panel. In some embodiments, the deployment angle 52 is in the range of 30 degrees to 90 degrees, while in other embodiments the deployment angle may be in the range of 40 degrees to 60 degrees.

In some embodiments, the end panel 42 is connected only to the base panels 40, while in other embodiments the end panel 42 and/or the base panels 40 may also be connected to the rear occupant seat 22b, such as via one or more snaps or clips, to provide desired energy absorption characteristics.

While in the illustrated embodiments the energy absorbing structure 36 is positioned between the passenger 32 and the nearest vehicle side door 38 at a first lateral side 54 of the rear occupant seat 22b, in other embodiments the energy absorbing structure 36 may be located, for example, at a second lateral side 56 of the rear occupant seat 22b, opposite the first lateral side 54. Further, while in some embodiments the base panels 40 extend toward the end panel 42 located at the rear occupant seat 22b, in other embodiments the configuration may be substantially reversed, with the base panels 40 extending from the rear occupant seat 22b and toward the end panel 42 located at the vehicle side door 38.

5

Figure 5:
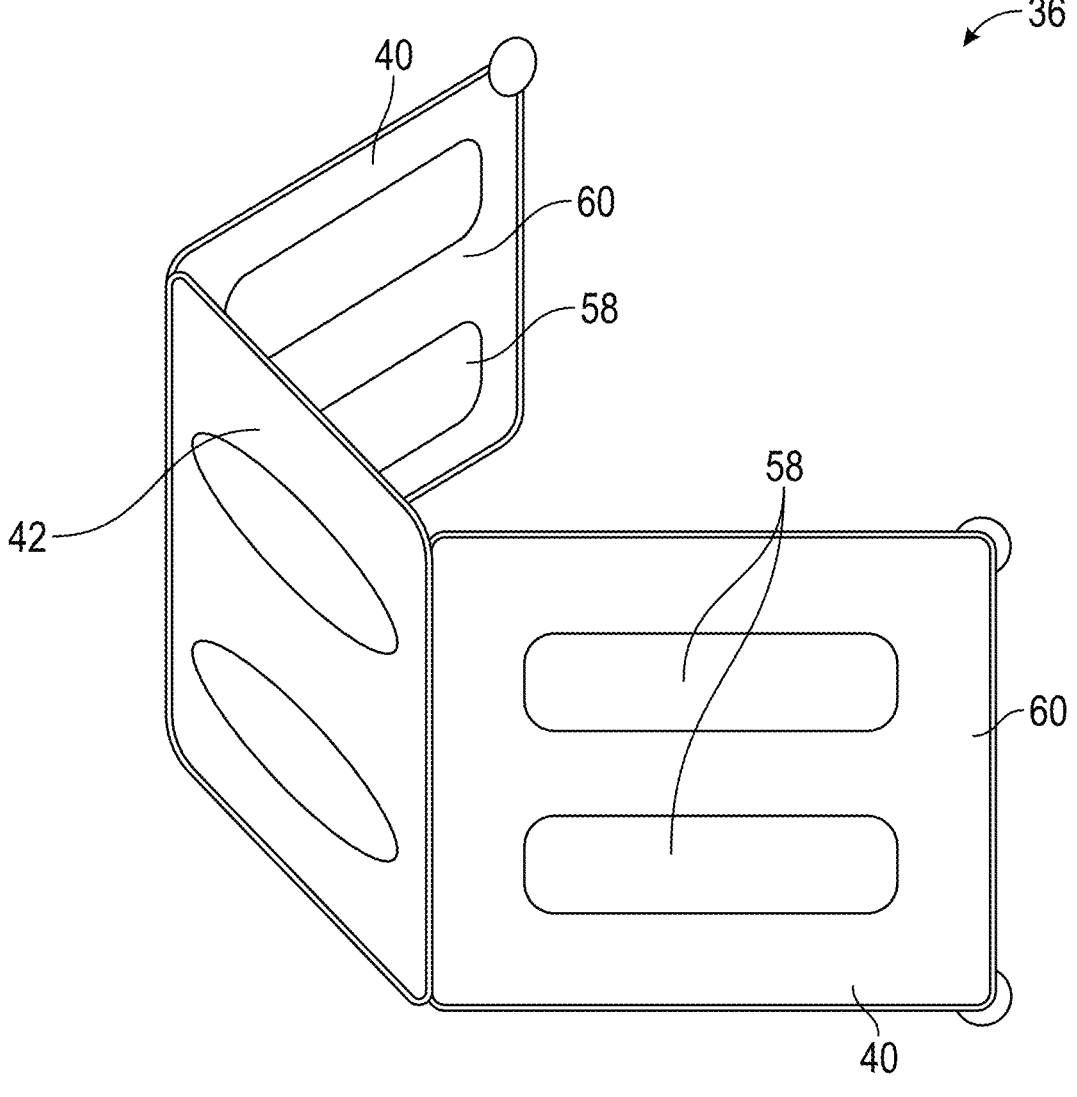
FIG. 5 is a perspective view of an exemplary embodiment of an energy absorbing structure in a deployed position.

Referring now to FIG. 5, the panels 40 and 42 may have a plurality of panel openings 58, a plurality of panel ribs 60, or the like. The quantity, size and shape of the panel openings 58 or ribs 60 is selected to provide desired structural properties to the panels 40, such as strength, weight, flexibility, and the like to provide the desired energy absorbing performance of the energy absorbing structure 36. Additionally or alternatively, a material thickness of the panels 40 and 42 may be varied to provide the desired properties. The panels 40, 42 and panel joints can be composed of a combination of polymer and metallic elements, including but not limited to plastics, fiber-reinforced composites, aluminum, honeycomb and cellular metals and plastics, expanded polymeric foam.

The energy absorbing structure 36 might be a unitary structure. Alternatively, the energy absorbing structure might be a assembly all of whose degrees of freedom are constrained when it is in the deployed position so that it effectively behaves like a structure. In the former case, the user will need to assemble the structure in its deployed configuration when needed and disassemble it to achieve the stowed configuration when it is not needed. When the energy absorbing structure 36 starts out as a mechanism it is moved between the stowed position of FIG. 4 and the deployed position of FIG. 3 manually by the user by exercising one or more of the degrees of freedom of the mechanism. When the user locks the structure in the deployed position all of its degrees of freedom are constrained, thereby converting the mechanism into a structure with zero active degrees of freedom. In other embodiments, an actuator 62, illustrated in FIG. 3, is operably connected to, for example, one or more of the structural members to, when activated, urge the movement of the energy absorbing structure 36 between the stowed position and the deployed position. In some embodiments, the actuator 62 is activated via a switch at, for example, the dashboard 26 or at the vehicle side door 38. In other embodiments, the actuator 60 may be operably connected to one or more vehicle sensors 64 located in the occupant compartment 14, such as seat sensors, interior cameras or the like, such that when a passenger 32 is detected in the rear occupant seat 22b, the energy absorbing structure 36 is moved to the deployed position.

Figure 6:
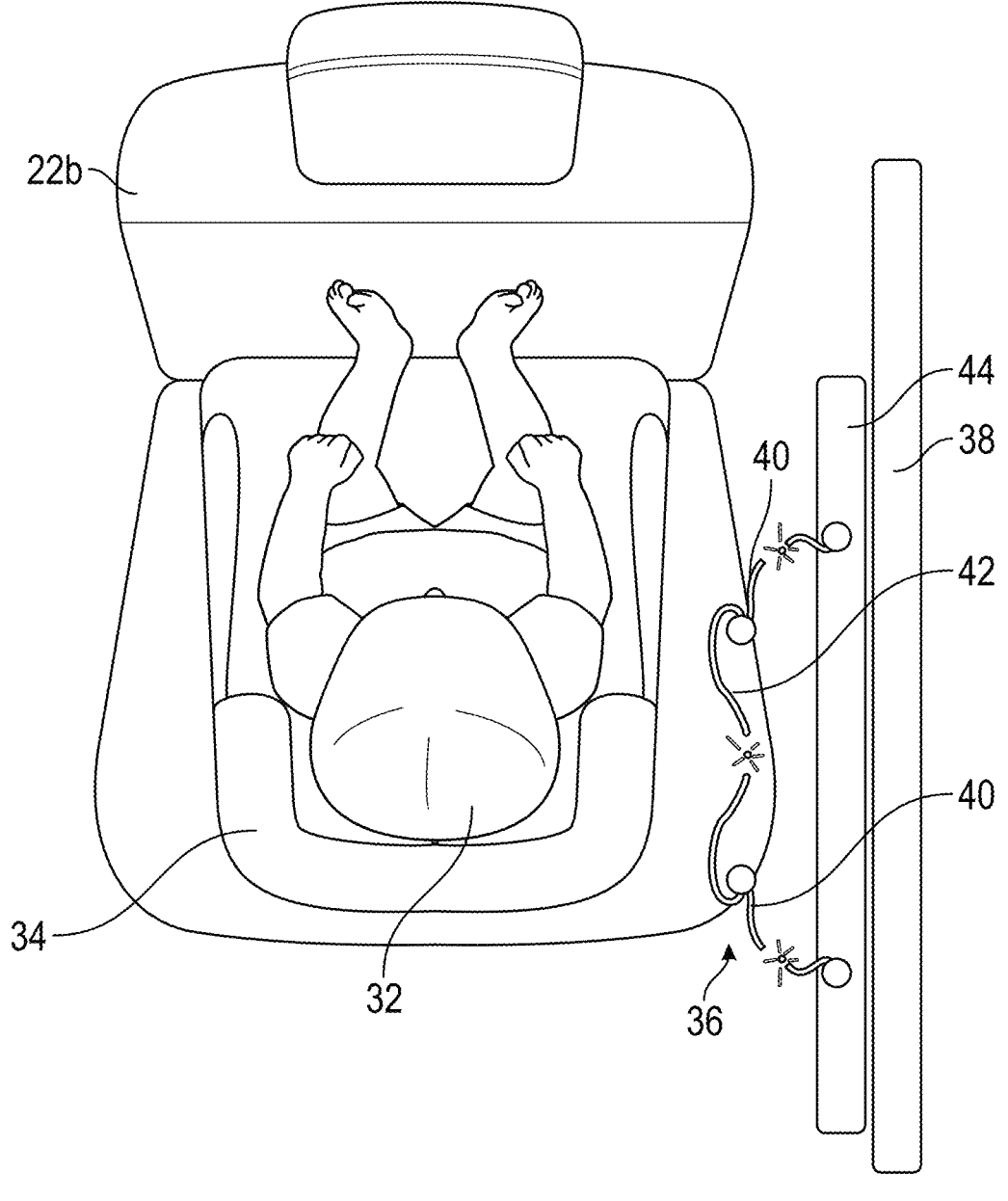
FIG. 6 is a top view illustrating operation of an exemplary energy absorbing structure in an impact event.

Referring now to FIG. 6, in a side impact event an impact force is applied at the vehicle side door 38, with at least a portion this impact energy absorbed by the panels 40, 42 of the energy absorbing structure 36 by deformation and/or fracture (such as shown) of the panels 40, 42. This absorption of energy by the energy absorbing structure 36 reduces the amount of energy from the impact event transferred into the passenger 32, providing improved protection for the passenger 32.

Figure 7:
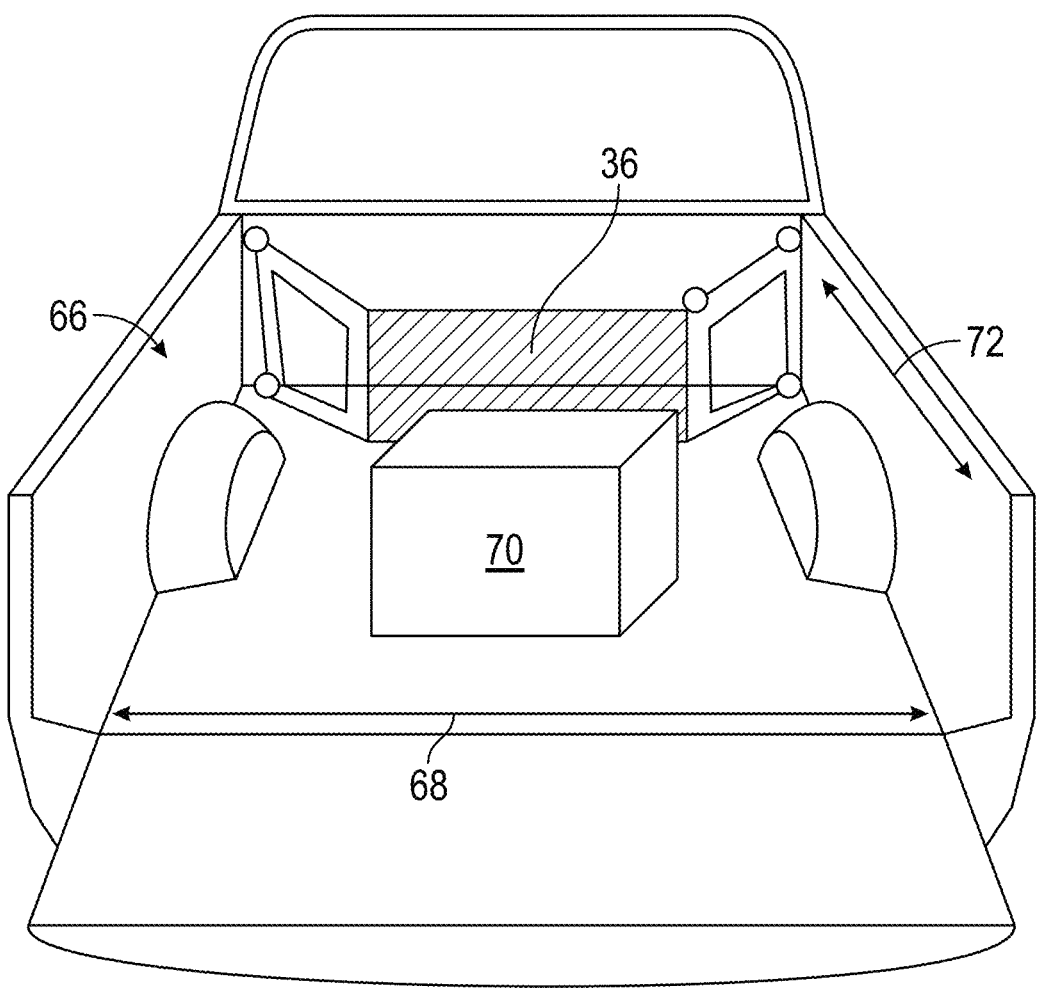
FIG. 7 is an illustration of an exemplary energy absorbing structure utilized in a cargo area of a vehicle.

Another exemplary embodiment is illustrated in FIG. 7, which illustrates a vehicle cargo area 66, such as a truck bed. The energy absorbing structure 36 is arrayed across a width 68 of the cargo area 66 to absorb energy of shifting cargo 70 in the cargo area 66 and to prevent damage to the cargo area 66 structure and/or to the cargo 70. While in the illustrated embodiment, the energy absorbing structure 36 extends across the width 68 of the cargo area 66, in other embodiments the energy absorbing structure 36 may be positioned, for example, along a length 72 of the cargo area 66.

The terms "a" and "an" do not denote a limitation of quantity, but rather denote the presence of at least one of the referenced items. The term "or" means "and/or" unless clearly indicated otherwise by context. Reference throughout the specification to "an aspect", means that a particular element (e.g., feature, structure, step, or characteristic) described in connection with the aspect is included in at least one aspect described herein, and may or may not be present in other aspects. In addition, it is to be understood that the described elements may be combined in any suitable manner in the various aspects.

Unless defined otherwise, technical and scientific terms used herein have the same meaning as is commonly understood by one of skill in the art to which this disclosure belongs.

While the above disclosure has been described with reference to exemplary embodiments, it will be understood by those skilled in the art that various changes may be made and equivalents may be substituted for elements thereof without departing from its scope. In addition, many modifications may be made to adapt a particular situation or material to the teachings of the disclosure without departing from the essential scope thereof. Therefore, it is intended that the present disclosure not be limited to the particular embodiments disclosed, but will include all embodiments falling within the scope thereof.

What is claimed is:

1. An energy absorbing structure of a vehicle, comprising:
a plurality of interconnected structural members disposed at the vehicle;
wherein the energy absorbing structure is selectably transformable between a stowed position and a deployed position; and
wherein the plurality of interconnected structural members is configured to absorb an energy of an impact event by one or more of deformation and fracture of at least one structural member of the plurality of interconnected structural members;
wherein the plurality of interconnected structural members includes:
two base members pivotably secured to a vehicle structure at a first end of each of the two base members; and
at least one end member secured at a second end of the two base members, opposite the first end.

2. The energy absorbing structure of claim 1, wherein the plurality of interconnected structural members includes one or more of panels, struts and tubes.

3. The energy absorbing structure of claim 1, wherein the plurality of interconnected structural members extends between a side door of the vehicle and a passenger seat of the vehicle.

4. The energy absorbing structure of claim 1, wherein the plurality of interconnected structural members has a modular construction.

5. The energy absorbing structure of claim 1, wherein in the deployed position, at least one base member of the two base members has a deployment angle relative to the vehicle structure in a range of 30 degrees to 90 degrees.

6. The energy absorbing structure of claim 1, wherein:
the two base members are secured to and extend from a side door of the vehicle; and the at least one end member is disposed at a passenger seat.

7. The energy absorbing structure of claim 6, wherein in the stowed position, the two base members extend along the side door.

8. The energy absorbing structure of claim 1, wherein one or more of the plurality of interconnected structural members includes one or more through openings defined by one or more of cutouts, stiffeners, or ribs.

9. The energy absorbing structure of claim 1, further comprising an actuator to selectably urge the energy absorbing structure between the stowed position and the deployed position.

10. A vehicle, comprising:

a vehicle body defining an occupant compartment;

two or more rows of seats disposed in the occupant compartment, the two or more rows of seats including a first seat row and a second seat row; and a safety system for an occupant of a seat of the two or more rows of seats of the vehicle, including:

an energy absorbing structure including a plurality of interconnected structural members extending between a side door of the vehicle and a passenger seat of the vehicle;

wherein the energy absorbing structure is selectably movable between a stowed position and a deployed position; and wherein the plurality of interconnected structural members is configured to absorb an energy of an impact event by one or more of deformation and fracture of at least one structural member of the plurality of interconnected structural members;

wherein the plurality of interconnected structural members includes:

two base members pivotably secured to a vehicle structure at a first end of each of the two base members; and at least one end member secured at a second end of the two base members, opposite the first end.

11. The vehicle of claim 10, wherein:

the two base members are secured to and extend from the side door of the vehicle; and the at least one end member is disposed at the passenger seat.

12. The vehicle of claim 11, wherein in the stowed position, the two base members extend along the side door.

13. The vehicle of claim 10, further comprising an actuator to selectably urge the energy absorbing structure between the stowed position and the deployed position.

14. The vehicle of claim 13, further comprising one or more vehicle sensors operably connected to the actuator to selectably activate the actuator.

15. A method of operating a safety system for an occupant of a vehicle, comprising:

detecting presence of an occupant of a seat of the vehicle; and moving an energy absorbing structure from a stowed position to a deployed position when the occupant is detected, wherein the energy absorbing structure includes:

a plurality of interconnected structural members extending between a side door of the vehicle and the seat; and wherein the plurality of interconnected structural members is configured to absorb an energy of an impact event by one or more of deformation and fracture of at least one structural member of the plurality of interconnected structural members;

wherein the plurality of interconnected structural members includes:

two base members pivotably secured to a vehicle structure at a first end of each of the two base members; and at least one end member secured at a second end of the two base members, opposite the first end.

16. The method of claim 15, wherein the plurality of interconnected structural members includes one or more of panels, struts and tubes.

17. The method of claim 15, wherein:

the two base members are secured to and extend from the side door of the vehicle; and the at least one end member is disposed at the passenger seat.

* * * * *